Dec. 15, 1959 R. T. CASEY ET AL 2,917,179

RECORD HOLDER

Filed July 8, 1955

United States Patent Office 2,917,179

Patented Dec. 15, 1959

2,917,179

RECORD HOLDER

Robert T. Casey, Southington, and Gregory M. Casey, Forestville, Conn.

Application July 8, 1955, Serial No. 520,783

2 Claims. (Cl. 211—40)

Our invention relates to holders for disc-type sound records, and particularly to such holders which are adapted to hold records in a readily accessible manner, wherein all such records are directly visible and accessible.

In the past, holders for disc-type sound records of the type adapted to hold such records in either a directly visible or accessible manner, have ordinarily comprised a plurality of members of either wire, strip or flat sheet material adapted to act as separators, in combination with suitable uniting and supporting means. Such devices have been complicated in construction and difficult to manufacture, and consequently relatively expensive.

Prior art holders for such records have also ordinarily included portions which, in either the inserting, removing or holding operations, come in contact with the recording-bearing surface areas of such records. Consequently, continued use of such holders is likely to cause wear or damage to such surfaces and deterioration of the quality of the recording, especially when the records are of the relatively delicate, finely-grooved type, or when the material of which the record is made is a relatively soft "break-resistant" flexible plastic material.

It is an object of the present invention to provide a record holder for disc-type sound records which utilizes a minimum number of parts.

It is a further object of the present invention to provide a record holder the parts of which may be readily fabricated by conventional simple manufacturing processes.

A further object of the invention is to provide a record holder, the parts of which may be assembled readily and easily by what are essentially hand operations, and with no special tools required.

An important object of our invention is to provide a holder for disc-type sound records which receives and holds such records in such a manner that no part of the recording-bearing surfaces of such records comes in contact with the holder or any part thereof at any time during use of the holder.

It is a further object of our invention in one embodiment, to provide a holder for disc-type sound records which is adapted to receive and hold such records without contact with the recording-bearing surfaces of such records, and which is also adjustable to receive and hold records of differing diameter.

In accordance with our invention in one form, we provide a holder comprising a generally channel-shaped support formed of sheet material and having a bottom portion and opposed upwardly-directed side portions, each of said side portions and said bottom portion having means thereon for cooperating in holding a plurality of disc-type sound records between the sides of said holder.

In accordance with one embodiment of our invention, the said means on the sides and bottom portions of the channel-shaped support is adapted to act as the separating means for the records as well as the supporting means therefor.

The construction and operation of our invention as well as additional objects and advantages will be apparent by reference to the following description and drawing, in which.

Figure 1:
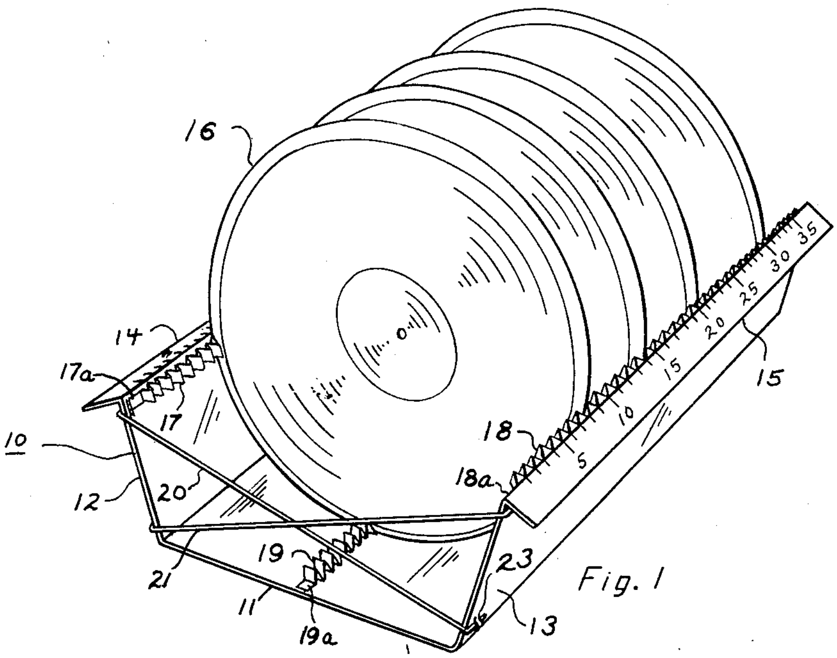
Figure 1 is a perspective view of a record holder made in accordance with our invention, a number of records being shown in place.

Referring to the drawings, our invention is shown as embodied in a device incorporating a generally channel-shaped holder or supporting base 10 formed of sheet material and having a generally flat bottom portion 11, and opposed upwardly-directed side portions 12 and 13, each having bent-over outwardly-directed flanges 14 and 15.

Figure 3:
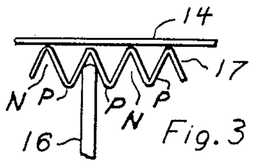
Figure 3 is a fragmentary view, on enlarged scale, of a portion of the record-holding and spacing means of the holder of Figure 1.

Record holding and spacing means are provided for holding and spacing a plurality of disc-type records 16 in the holder comprising strips 17, 18 and 19, each mounted on portions 11, 12 and 13 of the holder 10 respectively, by suitable means such as by welding or brazing, preferably at the ends **17*a*, 18*a* and 19*a*. If desired, one or more intermediate portions may also be similarly attached. Each of the strips 17, 18 and 19 comprises an elongated thin flat strip of sheet material having successive short portions thereof reverse-bent in zig-zag fashion, to provide, when assembled as shown, a plurality of generally V-shaped projections or separators P on the walls 11, 12 and 13**, and adjacent alternating notches N (see Figure 3).

In order to rigidify the base 10 and to limit separating movement of the side portions 12 and 13, we provide a pair of diagonal bracing struts 20 and 21. Each of the struts 20 and 21 comprises a rod having its end portions bent at right-angles to the main portion and received in lanced-out eyelets 22, 23, and 24, 25, in the side portions 12 and 13. It will be understood that the far end of the support 10 of Figure 1 is also provided with bracing struts (not shown) similar to those of 20 and 21.

Figure 2:
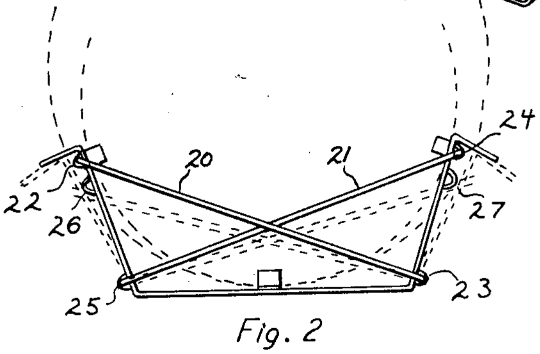
Figure 2 is a side elevation view of the record holder of Figure 1, the parts being shown in a different adjusted position in dotted lines.

For the purpose of making possible the adjustment of the support 10 so as to enable it to accept and hold records of slightly different diameter, additional lanced-out portions 26, 27 are provided. As indicated in dotted lines in Figure 2, when the upper ends of struts 20 and 21 are in the eyelets 26 and 27, the sides of the support are spaced and held slightly farther apart than when the struts are in the eyelets 22 and 24, respectively. The eyelets 26 and 27 in a particular sample, for instance, are used when it is desired to hold records of 12-inch diameter, and the eyelets 22 and 24 when it is desired to hold records of 10-inch diameter.

It is a feature of my invention in this form that the records 16 are easily and readily insertable into the holder 10 by merely holding each record just above the location at which it is desired to insert it and generally parallel to the ends of the holder, and dropping it or setting it into place. This is because the smoothly rounded apexes of the separators or projections P always direct the edge of the record into the adjacent notches N. Since the notches or recesses N are smooth-sided tapering nests, they receive the edges of the records snugly without danger of chipping and regardless of considerable variation in the thickness of such records, while also restraining the records from rattling.

The holding and spacing means 17, 18 and 19 are not only extremely effective in holding and spacing the records, but in so doing, they do not touch or engage any portion of the recording-bearing surfaces of the records. Thus no damage or wear to the records is occasioned by use of the holder, even to finely-grooved or relatively soft plastic records. The holding means 17, 18 and 19 also engage each of the records 16 at three relatively widely spaced points on the periphery thereof, the angle formed by the radii passing through the first and third such points respectively being preferably an obtuse angle. This triangular arrangement of supporting points prevents tipping of the records in the holder, and aids in keeping each spaced from and parallel to the others even though nothing touches the major flat surfaces of the records.

In addition to the above advantages, the holding means 17, 18 and 19 are relatively simple to manufacture and assemble, and render the manufacture and fabrication of the complete holder 10 very simple and inexpensive.

The outwardly-directed flange portions 14 and 15 are adapted to serve as handles for lifting the holder 10 and moving it about.

It will be seen that we have provided a holder for disc-type records which is extremely simple and inexpensive to fabricate and assemble and which has a number of functional advantages over prior holders for such records.

While we have described specific embodiments of our invention, it will be readily apparent that many modifications thereof may be made without departing from the spirit and scope of our invention, and we therefore wish to have it understood that we intend by the appended claims to cover all such modifications and variations as fall within the scope of our invention.

We claim:

1. A holder for generally disc-shaped sound records comprising a unitary support of sheet material having a bottom portion and two opposed upwardly directed side portions and record holding and spacing means carried by said support comprising a row of closely-spaced projections carried generally centrally of said bottom portion and along the upper edge of each of said side portions, said side walls being capable of being flexed toward and away from each other whereby said holder may be adapted to hold records of differing diameters at different times, and means for limiting such outward movement of said side portions to a predetermined desired amount comprising a bracing member extending from side to side of said support at each end thereof in a first position in which said bracing members support said side portions at a first predetermined spacing, and means for supporting said bracing members in a second position in which they support said side portions at a second predetermined spacing.

2. A holder for generally disc-shaped sound records comprising a support having a generally planar bottom portion and two opposed upwardly and outwardly directed side portions, record holding and spacing means for holding a number of said records in generally parallel closely-spaced relation between said side portions comprising an elongated strip of sheet material carried by said bottom portion and extending along the center line thereof parallel to said side portions and an elongated strip of sheet material carried by each of said side portions and extending along the upper edge thereof, each of said strips being anchored at the ends thereof only and having successive short portions thereof reverse-bent in zig-zag fashion to provide a series of generally V-shaped projections alternating with generally V-shaped recesses, each of said projections and recesses having an apex angle substantially less than ninety degrees, said side portions each having an outwardly and downwardly directed flange portion along the upper edge thereof adjacent said strips carried by said side portions to serve as handles for lifting said holder, said flanges bearing indicia information corresponding to the location of said successive recesses.

References Cited in the file of this patent

UNITED STATES PATENTS

| | | |
|---|---|---|
| 642,277 | Adair | Jan. 30, 1900 |
| 887,631 | Hawthorne | May 21, 1908 |
| 888,855 | Sisco | May 26, 1908 |
| 968,253 | Moses | Aug. 23, 1910 |
| 2,082,876 | Davis | June 8, 1937 |
| 2,288,317 | Greenberg | June 30, 1942 |
| 2,354,872 | Mitnick | Aug. 1, 1944 |
| 2,523,908 | Johnsen | Sept. 26, 1950 |

FOREIGN PATENTS

| | | |
|---|---|---|
| 324,482 | Great Britain | Jan. 30, 1930 |
| 446,807 | Great Britain | May 6, 1936 |
| 678,014 | France | Dec. 19, 1929 |
| 828,111 | France | Feb. 7, 1938 |